Dec. 8, 1959  F. C. HUGHES  2,915,845
FISH LURE RETRIEVERS
Filed Aug. 19, 1957
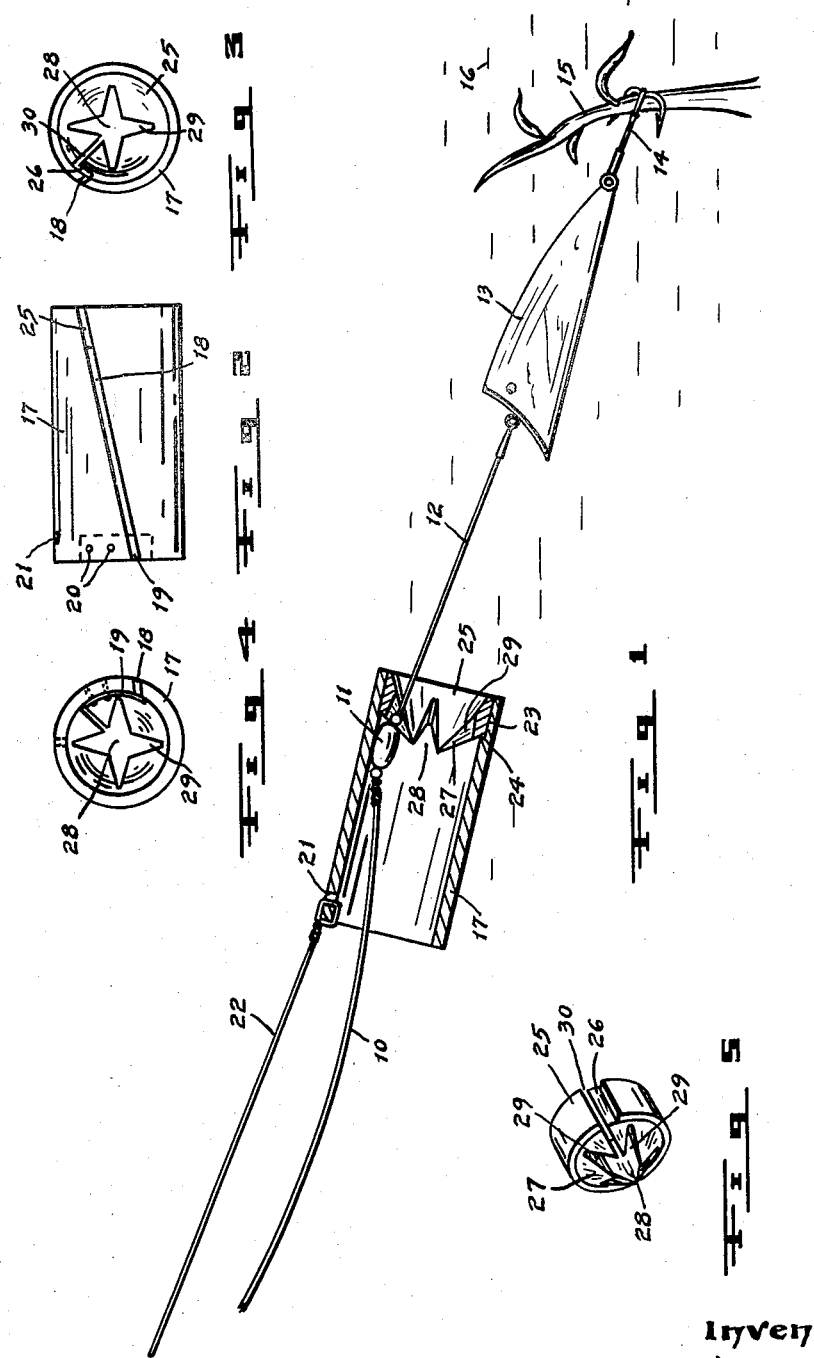
Inventor
Frederick C. Hughes
By
AGENT

United States Patent Office

2,915,845
Patented Dec. 8, 1959

2,915,845

FISH LURE RETRIEVER

Frederick C. Hughes, Winnipeg, Manitoba, Canada

Application August 19, 1957, Serial No. 679,001

3 Claims. (Cl. 43—17.2)

In the sport of fishing, and particularly when casting or trawling, the hook on the end of the fishing line, or on the lure, is inclined to get caught in weeds, roots, on rocks, or other holding material in the water. If too great a pull is made on the relatively light line to release same, it is almost certain to break, thus losing the hook and often an expensive lure.

The principal object of the present invention is to provide a retriever which can be slid down the fishing line when so caught, will grip the relatively strong line connection on the lure, and as the retriever has a strong line of its own, a strong pull thereon will release the caught hook by straightening it, or the caught object will be drawn to the surface by the hook, and so retrieve the lure.

A further object of the invention is to construct the retriever in a relatively simple and very efficient manner, easily attachable to the fishing line for sliding there-down, cannot self-release therefrom, will positively hold onto the lure connection, and can be quickly manually released from the fishing line by the operator when its work is done.

With the above important objects in view, the invention consists essentially in the design, construction and arrangement of the parts hereinafter more particularly described, reference being had to the accompanying drawings in which:

Figure 1 shows a fishing line with the hook of the lure caught by a submerged shrub or root, and with the retriever in position thereon for releasing said hook.

Figure 2 is a side view of the retriever alone and showing the longitudinal slot therein.

Figure 3 is a view of one end of the retriever.

Figure 4 is a view of the opposite end of the retriever.

Figure 5 is a perspective view of an insert for one end of the retriever.

In the drawings like characters of reference indicate corresponding parts in the several figures.

A fishing line is generally indicated by the reference number 10 and has one end thereof suitably secured to a fitting 11. The fitting in turn is fastened to a lure 13 through a strong flexible connection 12. The lure may be any shape or design for the purpose. Lures are usually provided with several attached hooks and in the present instance I have shown a single triple-pronged hook 14 thereon. As shown in Figure 1, this hook is caught on a shrub or root 15 extending up in the water, indicated at 16. Obviously, if the fishing line 10 is pulled very hard, and both the hook and root are capable of resisting the pull, the said fishing line will break.

The retriever, comprising the present invention, consists of a short tubing 17 having a slightly angular longitudinal slot 18 therealong and therethrough. A relatively thin piece of strap spring steel 19 is positioned within and at one end of the tubing, being secured against the interior wall thereof by a pair of rivets 20 while one free end thereof extends across that particular end of the slot 18 as an interior cover therefor. A hole 21 is also provided through this end of the tubing for the reception and end securing of a strong pulling line 22 thereto. The opposite interior end of the tubing 17 is counterbored to form a step 23 a short way in, with a shoulder 24 there around as a stop.

An insert 25 is shown separately in Figure 5 and is adapted to be received within the step 23 of the tubing 17. This insert presents a circular band on the outside with a fairly wide longitudinal groove 26 at one point on its periphery. The interior is coned back centrally from the band in a kind of bullet-shaped nose 27 to a central opening 28 of a four-pointed star-shape, the points of the opening being each cut or filed out in a V-shape 29 with a flat bottom to present tooth-like channels through the insert. A passage 30 is then cut lengthwise through one side of the insert from one side of the groove 26 down to the central opening 28, coming out between two of the points 29, as clearly shown in Figures 3, 4 and 5.

When so completed the inert appears as shown in Figure 5 and is slid into the stepped end 23 of the tubing 17 until it contacts the shoulder 24, at which time it is sweated therein as a fixture. Before the sweating is done, it is carefully turned to a position where the slot 18 of the tubing is in communication with the groove 26, at the side thereof remote from the passage 30 so the slot, the groove and the passage have a zig-zag relation in respect to each other, and as clearly shown in Figure 3.

In operation, when a hook is caught underwater as above described, a portion of the fishing line 10 above water (not shown) is held by the fisherman with both hands, same being fairly close together. The portion of the line between the hands is passed into the end of the slot 18, adjacent the spring steel strap 19, pressed therein by the hands until it slips past the spring into the tubing. At this time one end of the line extends from the centre of the tubing while the other end comes out through the slot 18 on the inner side of the spring. This latter part of the line is then slid along the slot 18 to the insert 25 where it is zig-zagged down through the slot 18, the groove 26 and the passage 30, and the fishing line then completely passes through the centre of the tubing. At this time it will also be passing through one of the channels 29 of the insert.

The retriever is then permitted to slide down the fishing line 10, the insert end first, by paying out the line 22, the channel 29 freely sliding past the fishing line. At the same time, the fishing line cannot enter the slot 18 as it is shielded by the spring strap 19. When the insert has bumped over the fitting 11 the line 22 is stopped, and then pulled back. At this time connection 12 will be in one of the channels 29 and the fitting 11 thereof will be caught between the insert and the inside wall of the tubing 17 as it cannot go through the channel (see Figure 1). As the line 22 is pulled, the fishing line 10 slackens. The fisherman then gives a heavy pull on the strong line 22 and the shrub or root 15 must give way or the fish hook 14 will straighten out to release therefrom and the lure with hook is brought to the surface.

It will be particularly observed that the fishing line cannot self-release from the retriever at any time, due to the spring strap 19 covering the slot 18 and the pointed channels 29 preventing entrance to the passage 30. Yet, the tubing of the retriever can freely slide down the fishing line to the lure or hook, if there is no other interference. Accordingly, nearly all caught hooks and lures can be retrieved.

When the retrieving operation is accomplished, the fitting 11 is carefully drawn back through the centre of the opening 28 in the insert and the line 10 is then back threaded up the passage 30, the groove 26 and along the slot 18 to the spring strap 19. The fishing line projecting out the slot 18 is then wrapped over the slot-covering spring 19 and is then collected with the part projecting out the end of the tubing. Both parts are then pulled inward of the tubing so that the wrapped portion pulls the spring away and it slips thereoff, and the fishing line is free of the tubing for further fishing use.

What I claim as my invention is:

1. A fish lure retriever, comprising: a tubing having a slot therealong for passage of a fishing line therethrough into the centre of said tubing; said tubing having one end thereof partially closed by an inwardly directed cone-shaped nose terminating in a central opening having tooth-shaped channels therearound therethrough; a continuation of said slot passing through said nose and centrally emerging between two of said channels; and a side opening through the opposite end of said tubing for connecting a pull line thereto, a spring member interiorally secured at said opposite end and resiliently overlying said slot at said opposite end.

2. A fish lure retriever, comprising: a tubing having a slot therealong for passage of a fishing line therethrough into the centre of said tubing; one end of said tubing having a side opening therethrough for connecting a pull line thereto; a flat spring member interiorally secured to said one end of said tubing and resiliently overlying the end of said slot at said one end, the opposite interior end of said tubing receiving an insert therein; said insert presenting an inwardly facing cone-shaped end wall for said tubing, the cone thereof terminating in a central opening having a series of tooth-shaped channels therearound and therethrough; a single groove across the exterior periphery of said insert; a longitudinal radial passage through said insert from one side of said groove to the central opening thereof between two of said channels; and said insert secured in said tubing end with that particular end of said slot registering with said groove, at the side thereof remote from said longitudinal passage.

3. A fish lure retriever, comprising: a tubing having an angularly positioned slot therealong for passage of a fishing line therethrough into the centre of said tubing; one end of said tubing having a side opening therethrough for connecting a pull line thereto; a flat spring member interiorly secured at said tubing end and resiliently overlying that particular end of said slot; the opposite interior end of said tubing being stepped to a larger diameter for reception of a permanent circular insert therein; said insert presenting an inwardly facing cone-shaped wall for said end of said tubing, the cone thereof terminating in a central opening having a series of V-shaped toothed channels therearound therethrough; a single groove across the exterior periphery of said insert; a longitudinal radial passage through said insert from one side of said groove to the central opening thereof, between two of said channels; and said insert being secured in said stepped end of said tubing with that particular end of said lot registering with said groove at the side thereof remote from said longitudinal passage.

References Cited in the file of this patent

UNITED STATES PATENTS

| | | |
|---|---|---|
| 2,235,371 | Jyrkas | Mar. 18, 1941 |
| 2,385,415 | Jackson | Sept. 25, 1945 |
| 2,526,031 | Kocarek | Oct. 17, 1950 |
| 2,608,785 | Hall | Sept. 2, 1952 |
| 2,627,691 | Bress | Feb. 10, 1953 |
| 2,714,777 | Peak | Aug. 9, 1955 |

FOREIGN PATENTS

| | | |
|---|---|---|
| 932,336 | France | Nov. 24, 1947 |